United States Patent [19]

Fukui et al.

[11] Patent Number: 5,086,100
[45] Date of Patent: Feb. 4, 1992

[54] INORGANIC FILLER CONTAINING POLYOLEFIN COMPOSITION

[75] Inventors: Yoshiharu Fukui; Kazuhisa Kuroda, both of Ichihara, Japan

[73] Assignee: Sumitomo Chemical Co., Ltd, Osaka, Japan

[21] Appl. No.: 606,936

[22] Filed: Oct. 31, 1990

Related U.S. Application Data

[62] Division of Ser. No. 348,418, May 8, 1989, Pat. No. 4,985,480.

[30] Foreign Application Priority Data

May 9, 1988 [JP] Japan .................. 63-113390

[51] Int. Cl.$^5$ .............................................. C08K 5/15
[52] U.S. Cl. .................................. 524/108; 524/128; 524/155; 524/237; 524/244; 524/245; 524/445; 524/449; 524/451
[58] Field of Search ............... 524/108, 237, 244, 451

[56] References Cited

U.S. PATENT DOCUMENTS

3,553,158  1/1971  Gilfillan et al. .
3,803,065  4/1974  Arai et al. .
4,829,112  5/1989  Ishii et al. .................. 524/108

FOREIGN PATENT DOCUMENTS

0155847   9/1985  European Pat. Off. .
2379569   9/1978  France .
54-74842  6/1979  Japan .
54-87745  7/1979  Japan .
55-142039 11/1980  Japan .
56-90844  7/1981  Japan .
56-50942  8/1981  Japan .
0215436  12/1983  Japan ......................... 524/244
62-273239 11/1987  Japan .
85156     9/1985  Luxembourg .
1565745   4/1980  United Kingdom .

OTHER PUBLICATIONS

"Hoechst Additives for Plastics, Phostanox Antioxidants and Various Hoechst Waxes", pp. 1-5.

*Primary Examiner*—Joseph L. Schofer
*Assistant Examiner*—Mark D. Sweet
*Attorney, Agent, or Firm*—Cushman, Darby, Cushman

[57] ABSTRACT

An inorganic filler-containing polyolefin composition which comprises
  100 parts by weight of a polyolefin,
  1-100 parts by weight of an inorganic filler,
  0.01-1.0 part by weight of a phenolic antioxidant represented by the general formula (I) shown below, and
at least one compound selected from the group consisting of the compounds represented by the general formulas (II) to (IV) shown below, and optionally 0.01-1.0 part by weight of a sulfur antioxidant and/or 0.01-2.0 parts by weight of a light stabilizer.

$$\left[ HO-\underset{C(CH_3)_3}{\underset{|}{\overset{R_1}{\underset{|}{\bigcirc}}}}-CH_2CH_2\underset{O}{\overset{\|}{C}}OCH_2-\underset{CH_3}{\overset{CH_3}{\underset{|}{C}}}-CH\underset{O-CH_2}{\overset{O-CH_2}{\diagup}}C \right]_2 \quad (I)$$

wherein $R_1$ represents an alkyl group of 1-3 carbon atoms, $$R_2-CO-NH-(CH_2)_n-HN-CO-R_2 \quad (II)$$

wherein $R_2$ represents an alkyl group or an alkenyl group of 5-21 carbon atoms, and n is an integer of 1 to 6.

$$R_3-CONH_2 \quad (III)$$

wherein $R_3$ represents an alkyl group or an alkenyl group of 5-21 carbon atoms.

$$R_4-N\diagdown_{(CH_2CH_2O)_nH}^{(CH_2CH_2O)_mH} \quad (IV)$$

and/or $$R_4-N\diagdown_{(CH_2CH_2O)_nH}^{(CH_2CH_2O)_mCOR_5}$$

wherein $R_4$ represents and alkyl group, an alkenyl group or an acyl group (R'—CO) of 8-18 carbon atoms, m and n are integers which meet $m+n-2$ to 10, R' represents an aliphatic carbon chain which may be saturated or unsaturated, and $R_5$ represents an alkyl group or an alkenyl group of 7-17 carbon atoms.

Excellent thermal-oxidation stability and/or light stability are obtained.

4 Claims, No Drawings

INORGANIC FILLER CONTAINING POLYOLEFIN COMPOSITION

This is a division of application Ser. No. 07/348,418, filed May 8, 1989, now U.S. Pat. No. 4,985,480.

The present invention relates to a polyolefin composition containing inorganic fillers, which is excellent in thermal-oxidation stability and light stability.

Inorganic fillers are widely used in order to improve polyolefins in mechanical properties such as stiffness, impact resistance, dimension stability and heat resistance.

However, inorganic fillers considerably deteriorate thermal-oxidation stability and light stability of polyolefins. Thus, there is a need to improve such defect.

In order to improve the deterioration of thermal-oxidation stability and light stability, various methods have been proposed as disclosed in Japanese Patent Publication (Kokai) Nos. 52-49254, 52-80345, 53-79938, 56-90844, 58-118437, 56-141339 and 62-273239. However, these methods are still insufficient.

The reason why the system containing inorganic fillers is low in thermal-oxidation stability and light stability is considered to be that inorganic fillers inactivate thermal-oxidation stabilizers and light stabilizers so that they cannot effectively function.

Under such circumstances, it is an object of the present invention to provide a polyolefin composition containing inorganic fillers, which overcomes the conventional defects in thermal-oxidation stability and light stability.

The present invention provides an inorganic filler-containing polyolefin composition which comprises 100 parts by weight of a polyolefin, 1-100 parts by weight of an inorganic filler, 0.01-1.0 part by weight of a phenolic antioxidant represented by the general formula (I) shown below, and at least one compound selected from the group consisting of the compounds represented by the general formulas (II) to (IV) shown below.

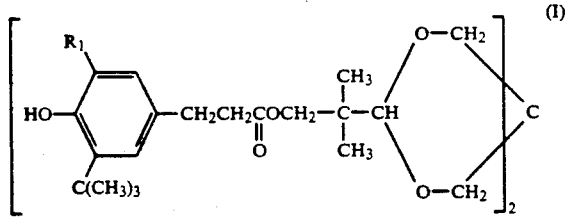

wherein $R_1$ represents an alkyl group of 1-3 carbon atoms, $$R_2-CO-NH-(CH_2)_n-HN-CO-R_2 \quad (II)$$

wherein $R_2$ represents an alkyl group or an alkenyl group of 5-21 carbon atoms, and n is an integer of 1 to 6, $$R_3-CONH_2 \quad (III)$$

wherein $R_3$ represents an alkyl group or an alkenyl group of 5-21 carbon atoms,

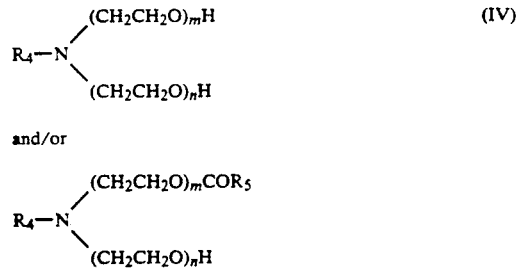

and/or wherein $R_4$ represents an alkyl group, an alkenyl group or an acyl group ($R'-CO$) of 8-18 carbon atoms, m and n are integers which meet $m+n=2$ to 10, $R'$ represents an aliphatic hydrocarbon chain which may be saturated or unsaturated, and $R_5$ represents an alkyl group or an alkenyl group of 7-17 carbon atoms.

This compound is excellent in thermal-oxidation stability.

The present invention also provides an inorganic filler-containing polyolefin composition which comprises 0.01-1.0 part by weight of a sulfur antioxidant in addition to the above-mentioned composition. This composition is also excellent in thermal-oxidation stability.

The present invention further provides an inorganic filler-containing polyolefin composition which comprises 0.01-2.0 parts by weight of a light stabilizer in addition to one of the above-mentioned composition. This composition is excellent in light stability as well as thermal-oxidation stability.

The polyolefin used in the present invention includes homopolymer of α-olefin such as ethylene, propylene, butene-1, hexene-1 or 4-methyl-pentene-1, and random or block copolymer comprising two or more of such α-olefins as listed above. Examples of the polyolefin are polyethylene, polypropylene, polybutene-1, polyisobutene, poly-3-methyl-butene-1, poly-4-methyl-pentene-1, ethylene-propylene copolymer, ethylene-butene-1 copolymer, propylene-4-methyl-pentene-1 copolymer, propylene-butene-1 copolymer, decene-1-4-methyl-pentene-1 copolymer, ethylene-propylene butene-1 copolymer, etc. In the case of copolymer, comonomer may be multiunsaturated compound such as conjugated or nonconjugated dienes or acrylic acid, methacrylic acid, vinyl acetate or the like. These polymers further include modified ones with acid, for example, polymers graft-modified with α,β-unsaturated aliphatic acid, cycloaliphatic carboxylic acid or derivatives thereof and also include rubbery, fatty and waxy polymers.

In the present invention, the polyolefin may be a mixture obtained by adding to an above-mentioned polyolefin a synthetic rubber, depending upon an application. The synthetic rubber which may be used in the present invention is preferably ethylene-α-olefin copolymer rubber, for example, copolymer rubbers of ethylene and α-olefin, e.g., propylene, butene-1 or hexene-1; or ternary copolymer rubber (hereinafter referred to as EPDM) in which non-conjugated dienes, for example, ethylidene norbornene or cyclopentadiene is copolymerized as the third component with the ethylene-propylene copolymer. Among them, ethylene-propylene copolymer rubber and EPDM are most preferred.

The inorganic filler which can be used in the present invention include, for example, talc, mica, wollastonite, calcium carbonate, barium sulfate, magnesium carbonate, clay, alumina, silica, calcium sulfate, carbon fibers, glass fibers, metal fibers, silica sand, carbon black, titanium oxide, magnesium hydroxide, zeolite, molybdenum, diatomaceous earth, sericite, white sand, microballoon, calcium hydroxide, calcium sulfite, sodium sulfate, bentonite and graphite. Among them, talc, mica, glass fibers, wollastonite and the like are preferred for improving impact resistance at low temperature, moldability and paintability.

The amount of inorganic fillers to be added is 1–100 parts by weight, preferably 5–80 parts by weight, based on 100 parts by weight of polyolefin. If the amount is more than 100 parts by weight, moldability deteriorates when a molded article is produced, or appearance of the molded article is degraded even though it can be molded. If the amount is less than 1 part by weight, mechanical properties such as stiffness, dimension stability and heat stability of molded articles are not sufficiently improved.

The phenolic antioxidant represented by the general formula (I):

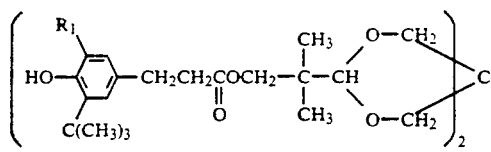

includes, for example, compounds shown by the following formulas:

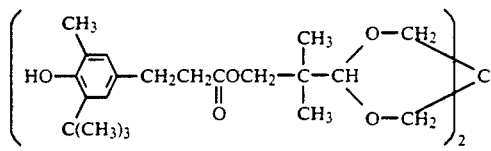

and

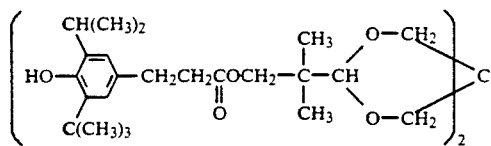

These phenolic antioxidants impart thermal-oxidation stability to inorganic filler-containing polyolefins more effectively than other phenolic antioxidants.

The sulfur antioxidant used in the present invention includes dilauryl-thio-dipropionate, dimyristyl-thio-dipropionate, distearyl-thio-dipropionate and pentaerythritol tetrakis($\beta$-laurylthiopropionate). Among them, pentaerythritol tetrakis($\beta$-laurylthiopropionate) is preferred.

When the sulfur antioxidant is used together with the phenolic antioxidant in a ratio of the latter to the former of 1:3–4, the most significant effect is obtained.

The amount each of the phenolic antioxidant represented by the formula (I) and the sulfur antioxidant is each 0.01–1.0 part by weight, preferably 0.05–0.8 part by weight, based on 100 parts by weight of polyolefin. If it is 1.0 part by weight or more, fuming sometimes occurs during molding process or bleed out may appear on the surface of molded articles, and also it is economically inadvisable. If it is 0.01 part by weight or less, the effect of the present invention cannot be sufficiently attained.

The light stabilizer used in the present invention includes salicylate compounds, benzophenone compounds, benzotriazole compounds, nickel chelate compounds and hindered amine compounds. These compounds may be used alone or in combination thereof.

Examples of these compounds are 2,4-di-t-butylphenyl-3,5-di-t-butyl-4-hydroxybenzoate, 4-octylphenyl-3,5-di-t-butyl-4-hydroxybenzoate, 2-hydroxy-4-methoxybenzophenone, 2-hydroxy-4-octoxybenzophenone, 2(2'-hydroxy-3'-t-butyl-5'-methylphenyl)-5-chlorobenzotriazole, 2(2'-hydroxy-3',5'-di-t-butylphenyl)-5-chlorobenzotriazole, bis(2,2,6,6-tetramethyl-4-piperidyl)sebacate, polycondensate of succinic acid and dimethyl-1-(2-hydroxyethyl)-4-hydroxy-2,2,6,6-tetramethylpiperidine, poly[{6-(1,1,3,3-tetramethylbutyl)imino-1,1,3,5-triazine-2,4-diyl}{2,2,6,6-tetramethyl-4-piperidyl)imino}hexamethylene{(2,2,6,6-tetramethyl-4-piperidyl)imino}], nickel-bis(3,5-di-t-butyl-4-hydroxybenzyl)-2-n-butylmalonato, [2,2'-thiobis(4-t-octylphenolate)]-n-butylaminenickel II and the like.

In the present invention, the amount of light stabilizer to be added is 0.01–2.0 parts by weight, preferably 0.05–1.5 parts by weight, based on 100 parts by weight of polyolefin. If it is 2.0 parts by weight or more, fuming sometimes occurs upon molding process or breed out may appear on the surface of molded articles, and also it is economically inadvisable. If it is 0.01 part by weight or less, the effect of the present invention cannot be achieved sufficiently.

It is needless to say that both the light stabilizer and the sulfur antioxidant may be used in the present invention.

Examples of the compounds represented by the general formula (II): $R_2$—CO—NH—$(CH_2)_n$—H-N—CO—$R_2$, which are used in the present invention, include methylenebisstearamide, ethylenebisstearamide, ethylenebisoleamide, hexamethylenebisstearamide and the like.

Examples of the compounds represented by the general formula (III): $R_3$—$CONH_2$, which is used in the present invention, include lauramide, stearamide, oleamide, behenamide, erucamide and the like.

Examples of the compounds represented by the general formula (IV):

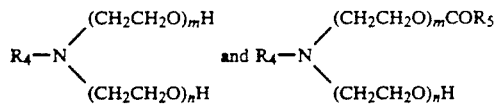

which is used in the present invention, include compounds shown by the following formulas:

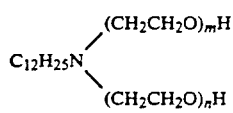

(m + n = 10)

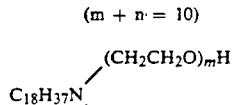

(m + n = 2)

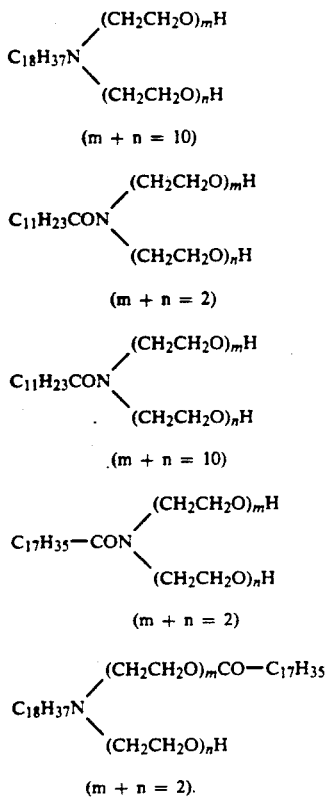

(m + n = 10)

(m + n = 2)

(m + n = 10)

(m + n = 2)

(m + n = 2).

Addition amount of the compounds represented by the general formulas (II) to (IV) is respectively 0.01-1.0 part by weight, preferably 0.05-0.8 part by weight, based on 100 parts by weight of polyolefin. If it is 1.0 parts by weight or more, fuming sometimes occurs upon molding process or bleed out may appear on the surface of shaped articles, and also it is economically inadvisable. If it is 0.01 part by weight or less, the effect of the present invention cannot be achieved sufficiently.

It is preferred that a phosphorus antioxidant is added to the present composition since it further improves thermal-oxidation stability and light stability.

Examples of the phosphorus antioxidant are distearylpentaerythritol diphosphite, tris(2,4-di-t-butylphenyl)phosphite, bis(2,4-di-t-butylphenyl)pentaerythritol diphosphite, tetrakis(2,4-di-t-butylphenyl)4,4'-biphenylene diphosphonite and trinonylphenyl phosphite.

The composition of the present invention may contain other additives, for example, process oils, plasticizers, lubricating oils, neutralizing agents, antioxidants, heavy metal inactivating agents, lubricants, nucleating agents, antistatic agents, release agents, pigments and antifungal agents, so long as they do not make any harm to properties of the composition.

The composition according to the present invention is obtained by kneading in a heat-molten state by use of an ordinary kneading machine such as a uniaxial extruder, a biaxial extruder, a banbury mixer, a roll and a kneader.

Products obtained from the inorganic filler-containing polyolefin composition according to the present invention as described above have extremely excellent thermal-oxidation stability and light stability.

Hereinafter, the present invention will be more specifically set forth with reference to examples.

Test methods of thermal-oxidation stability and light stability in the examples were as follows:

TEST METHOD FOR THERMAL-OXIDATION STABILITY

The thermal-oxidation stability was evaluated in accordance with test method for thermal degradation of thermoplastics (oven method), general rule, prescribed in JIS K 7212. Namely, a time period (GO life) in which the test specimen of a pressed sheet having a thickness of 1 mm is completely degraded, or, in other words, in which its pull strength becomes zero, was determined at 150° C. using a gear oven manufactured by Toyo Seiki Seisakusho Kabushiki Kaisha.

TEST METHOD FOR LIGHT STABILITY

The accelerated light-resistance test was carried out using a Sunshine Super Long Life Weatherometer (model: WEL-SUN-DC) manufactured by Suga Tester Kabushiki Kaisha. Then, a time period in which any external abnormality such as crackings appears on the surface of the test specimen, was determined. The test conditions were as follows:

| | |
|---|---|
| (1) Size of test specimen | Pressed sheet of 70 mm × 25 mm × 1 mm (thick) |
| (2) Black panel temperature | 83° C. |
| (3) Spray/dry cycle | 18 min/120 min |
| (4) Humidity in a tester vessel | 50% RH |
| (5) Observation for the external abnormality such as crackings | microscopic observation (×50) |

EXAMPLES 1-12

One hundred parts by weight of powder of crystalline ethylene-propylene block copolymer (ethylene content: 7.2 wt %, melt index: 3.0 g/10 min) and the other components shown by the formulation of Table 1 were melt-kneaded in a banbury mixer at 180° C. for 10 minutes. Then, the resultant mixture was made into a sheet having a thickness of 5 mm by use of a roll and hardened by cooling, and then was pelletized by cutting.

The obtained pellets were shaped at 230° C. into a pressed sheet having a thickness of 1 mm. A disc test specimen having a diameter of 25 mm was punched out of the sheet, and its GO life at 150° C. was measured. The result is shown in Table 1.

COMPARATIVE EXAMPLES 1-15

Test specimens were prepared in the same manner as in Examples 1-12 except that the formulations shown in Table 2 were employed.

Their GO lives at 150° C. were measured. The result is shown in Table 2.

EXAMPLES 13-16

One hundred parts by weight of powder of crystalline ethylene-propylene block copolymer (ethylene content: 7.2 wt %, melt index: 3.0 g/10 min) and the other components shown by the formulation of Table 3 were melt-kneaded in a banbury mixer at 180° C. for 10 minutes. Then, the resultant mixture was made into a sheet having a thickness of 5 mm by use of a roll and hardened by cooling, and then was pelletized by cutting.

The obtained pellets were shaped at 230° C. into a pressed sheet having a thickness of 1 mm. A test specimen having a dimension of 70 mm×25 mm was punched out of the sheet, and subjected to the accelerated light-resistance test. A time period in which external abnormality such as crackings occurs was measured. The result is shown in Table 3.

COMPARATIVE EXAMPLES 16-20

Test specimens were prepared in the same manner as in Examples 13-16 except that the formulations shown in Table 3 were employed.

The test specimens were subjected to the accelerated light-resistance test. And, time periods in which external abnormality such as crackings occurs were measured.

TABLE 1

(Examples 1-12)

| | Inorganic filler | A-1 | A-2 | A-3 | A-4 | EBS | Ole amide | SDE amine | 150° C. GO life (Hrs) |
|---|---|---|---|---|---|---|---|---|---|
| Example 1 | Talc 25 | 0.05 | 0.2 | — | — | 0.05 | — | — | 1010 |
| Example 2 | Talc 25 | 0.05 | 0.2 | — | — | — | — | 0.05 | 950 |
| Example 3 | Talc 25 | 0.05 | 0.05 | 0.15 | — | 0.05 | — | — | 1460 |
| Example 4 | Talc 25 | 0.05 | 0.05 | 0.15 | — | — | — | 0.05 | 1310 |
| Example 5 | Talc 25 | 0.05 | 0.05 | — | 0.15 | 0.05 | — | — | 2220 |
| Example 6 | Talc 25 | 0.05 | 0.05 | — | 0.15 | — | 0.05 | — | 2050 |
| Example 7 | Talc 25 | 0.05 | 0.05 | — | 0.15 | — | — | 0.05 | 2180 |
| Example 8 | Talc 25 | 0.05 | 0.1 | — | 0.3 | 0.05 | — | — | 3600 |
| Example 9 | Mica 25 | 0.05 | 0.2 | — | — | 0.1 | — | — | 750 |
| Example 10 | Mica 25 | 0.05 | 0.05 | — | 0.15 | 0.1 | — | — | 1640 |
| Example 11 | Mica 25 | 0.05 | 0.2 | — | — | 0.05 | — | — | 920 |
| Example 12 | Mica 25 | 0.05 | 0.05 | — | 0.15 | 0.05 | — | — | 2090 |

A-1: Calcium stearate

A-2:

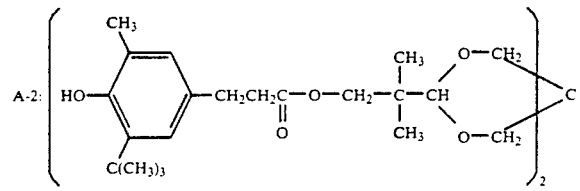

(SUMILIZER GA ® -80 manufactured by Sumitomo Chemical Co. Ltd.)

A-3: Dimyristyl-thio-dipropionate

A-4: Pentaerythritol tetrakis($\beta$-laurylthiopropionate)

EBS: Ethylenebisstearamide

Ole amide: Methylenebisoleamide

SDE amine: N,N-bishydroxyethylstearylamine

Talc: Micron White 5000S manufactured by Hayashi Kasei Kabushiki Kaisha

Mica: S-150 manufactured by Kabushiki Kaisha Repko

TABLE 2

(Comparative Examples 1-15)

| | Inorganic filler | A-1 | A-2 | A-3 | A-4 | A-5 | A-6 | Mono gly | S.A. | EBS | 150° C. GO life (Hrs) |
|---|---|---|---|---|---|---|---|---|---|---|---|
| Comparative Example 1 | Talc 25 | 0.05 | 0.2 | — | — | — | — | — | — | — | 160 |
| Comparative Example 2 | Talc 25 | 0.05 | 0.05 | 0.15 | — | — | — | — | — | — | 180 |
| Comparative Example 3 | Talc 25 | 0.05 | 0.05 | — | 0.15 | — | — | — | — | — | 280 |
| Comparative Example 4 | Talc 25 | 0.05 | 0.1 | — | 0.3 | — | — | — | — | — | 460 |
| Comparative Example 5 | Talc 25 | 0.05 | 0.05 | — | 0.15 | — | — | 0.1 | — | — | 340 |
| Comparative Example 6 | Talc 25 | 0.05 | 0.05 | — | 0.15 | — | — | — | 0.1 | — | 280 |
| Comparative Example 7 | Talc 25 | 0.05 | — | 0.15 | — | 0.05 | — | — | — | 0.05 | 700 |
| Comparative Example 8 | Talc 25 | 0.05 | — | — | 0.15 | 0.05 | — | — | — | 0.05 | 700 |
| Comparative Example 9 | Mica 25 | 0.05 | — | 0.15 | — | — | 0.05 | — | — | 0.05 | 600 |
| Comparative Example 10 | Mica 65 | 0.05 | 0.2 | — | — | — | — | — | — | — | 90 |
| Comparative Example 11 | Mica 65 | 0.05 | 0.05 | — | 0.15 | — | — | — | — | — | 120 |
| Comparative Example 12 | Mica 65 | 0.05 | — | — | 0.15 | 0.05 | — | — | — | 0.05 | 650 |
| Comparative Example 13 | Mica 25 | 0.05 | 0.2 | — | — | — | — | — | — | — | 150 |
| Comparative Example 14 | Mica 25 | 0.05 | 0.05 | — | 0.15 | — | — | — | — | — | 170 |

TABLE 2-continued (Comparative Examples 1-15)

| | Inorganic filler | A-1 | A-2 | A-3 | A-4 | A-5 | A-6 | Mono gly | S.A. | EBS | 150° C. GO life (Hrs) |
|---|---|---|---|---|---|---|---|---|---|---|---|
| Comparative Example 15 | Mica 25 | 0.05 | — | — | 0.15 | 0.05 | — | — | — | 0.05 | 650 |

A-1: Calcium stearate

A-2: 
$$\left\{ HO-\underset{C(CH_3)_3}{\underset{|}{\overset{CH_3}{\overset{|}{\bigcirc}}}}-CH_2CH_2\underset{O}{\overset{\|}{C}}-O-CH_2-\underset{CH_3}{\overset{CH_3}{\overset{|}{C}}}-CH\underset{O-CH_2}{\overset{O-CH_2}{\diagup}}C \right\}_2$$

(SUMILIZER GA ® -80 manufactured by Sumitomo Chemical Co. Ltd.)
A-3: Dimyristyl-thio-dipropionate
A-4: Pentaerythritol tetrakis(β-laurylthiopropionate)
A-5: Tetrakis[methylene-3-(3,5-di-t-butyl-4-hydroxyphenyl)propionate]methane
A-6: 1,3,5-tris(3,5-di-t-butyl-4-hydroxybenzyl)isocyanurate
Mono Gly: Glycerin monostearate
S.A.: Stearic acid (C$_{17}$H$_{35}$COOH)
EBS: Ethylenebisstearylamide
Talc: Micron White 5000S manufactured by Hayashi Kasei Kabushiki Kaisha
Mica: S-150 manufactured by Kabushiki Kaisha Repko

TABLE 3

(Examples 13-16 and Comparative Examples 16-20)

| | Inorganic filler | A-1 | A-2 | A-5 | L-1 | L-2 | P-1 | EBS | SDE amine | Mono gly | S.A. | Light stability (time when cracking) (hrs.) |
|---|---|---|---|---|---|---|---|---|---|---|---|---|
| Example 13 | Talc 25 | 0.05 | 0.1 | — | 0.1 | 0.1 | — | 0.05 | — | — | — | 1700 |
| Example 14 | Talc 25 | 0.05 | 0.1 | — | 0.1 | 0.1 | — | — | 0.05 | — | — | 1850 |
| Example 15 | Talc 25 | 0.05 | 0.1 | — | 0.1 | 0.1 | 0.1 | 0.05 | — | — | — | 2150 |
| Example 16 | Mica 25 | 0.05 | 0.1 | — | 0.1 | 0.1 | — | 0.05 | — | — | — | 1550 |
| Comparative Example 16 | Talc 25 | 0.05 | 0.1 | — | 0.1 | 0.1 | — | — | — | — | — | 950 |
| Comparative Example 17 | Talc 25 | 0.05 | 0.1 | — | 0.1 | 0.1 | — | — | — | 0.05 | — | 1100 |
| Comparative Example 18 | Talc 25 | 0.05 | 0.1 | — | 0.1 | 0.1 | — | — | — | — | 0.05 | 1000 |
| Comparative Example 19 | Talc 25 | 0.05 | — | 0.1 | 0.1 | 0.1 | — | 0.05 | — | — | — | 1450 |
| Comparative Example 20 | Mica 25 | 0.05 | 0.1 | — | 0.1 | 0.1 | — | — | — | — | — | 850 |

A-1: Calcium stearate

A-2:
$$\left\{ HO-\underset{C(CH_3)_3}{\underset{|}{\overset{CH_3}{\overset{|}{\bigcirc}}}}-CH_2CH_2\underset{O}{\overset{\|}{C}}-O-CH_2-\underset{CH_3}{\overset{CH_3}{\overset{|}{C}}}-CH\underset{O-CH_2}{\overset{O-CH_2}{\diagup}}C \right\}_2$$

(SUMILIZER GA ® -80 manufactured by Sumitomo Chemical Co. Ltd.)
A-5: Tetrakis[methylene-3-(3,5-di-t-butyl-4-hydroxyphenyl)propionate]methane
L-1: Bis(2,2,6,6-tetramethyl-4-piperidyl)sebacate
L-2: 2(2'-hydroxy-3'-t-butyl-5'-methylphenyl)-5-chlorobenzotriazole
P-1: Distearylpentaerythritol diphosphite
EBS: Ethylenebisstearamide
SDE amine: N,N-bishydroxyethylstearylamine
Mono Gly: Glycerin monostearate
S.A.: Stearic acid (C$_{17}$H$_{35}$COOH)
Talc: Micron White 5000S manufactured by Hayashi Kasei Kabushiki Kaisha
Mica: S-150 manufactured by Kabushiki Kaisha Repko

EXAMPLES 17-19

One hundred parts by weight of powder of crystalline ethylene-propylene block copolymer (ethylene content: 7.2 wt %, melt index: 3.0 g/10 min) and the other components shown by the formulation of Table 4 were melt-kneaded in a banbury mixer at 180° C. for 10 minutes. Then, the resultant mixture was made into a sheet having a thickness of 5 mm by use of a roll and hardened by cooling, and then was pelletized by cutting.

The obtained pellets were shaped at 230° C. into a pressed sheet having a thickness of 1 mm. A disc test specimen having a diameter of 25 mm was punched out of the sheet, and its GO life at 150° C. was measured.

Another specimen having a dimension of 70 mm×25 mm was also punched out of the above sheet and subjected to the accelerated light-resistance test. And, a time period in which external abnormality such as crackings occurs was measured.

The results are shown in Table 4.

COMPARATIVE EXAMPLES 21-23

Test specimens were prepared in the same manner as in Examples 17-19 except that the formulations shown in Table 4 were employed.

Their GO lives at 150° C. were measured. Also, the test specimens were subjected to the accelerated light-resistance test. And, time periods in which external abnormality such as crackings occurs were measured. The results are shown in Table 4.

TABLE 4

(Examples 17-19 and Comparative Examples 21-23)

| | | Formulation (part by weight) | | | | | | | 150° C. GO life (Hrs.) | Light stability (Time when cracking) (hrs.) |
|---|---|---|---|---|---|---|---|---|---|---|
| | Inorganic filler | A-1 | A-2 | A-6 | A-7 | L-1 | L-2 | L-3 | SDE amine | |
| Example 17 | Talc 30 | 0.05 | 0.1 | — | 0.3 | 0.3 | — | — | 0.3 | 2440 | 1120 |
| Example 18 | Talc 30 | 0.05 | 0.1 | — | 0.3 | — | 0.3 | — | 0.3 | 3040 | 550 |
| Example 19 | Talc 30 | 0.05 | 0.1 | — | 0.3 | — | — | 0.3 | 0.3 | 2680 | 900 |
| Comparative Example 21 | Talc 30 | 0.05 | — | 0.1 | 0.3 | 0.3 | — | — | 0.3 | 1150 | 750 |
| Comparative Example 22 | Talc 30 | 0.05 | — | 0.1 | 0.3 | — | 0.3 | — | 0.3 | 1300 | 300 |
| Comparative Example 23 | Talc 30 | 0.05 | — | 0.1 | 0.3 | — | — | 0.3 | 0.3 | 1240 | 650 |

A-1: Calcium stearate

A-2: 
$$\left[ HO-\underset{C(CH_3)_3}{\underset{|}{\overset{CH_3}{\overset{|}{\bigcirc}}}}-CH_2CH_2\overset{O}{\overset{\|}{C}}-O-CH_2-\underset{CH_3}{\overset{CH_3}{\overset{|}{C}}}-CH\overset{O-CH_2}{\underset{O-CH_2}{<}}C \right]_2$$

(SUMILIZER GA ®-80 manufactured by Sumitomo Chemical Co. Ltd.)

A-6: 1,3,5-tris(3,5-di-t-butyl-4-hydroxybenzyl)isocyanurate
A-7: Distearyl-thio-dipropionate
L-1: Bis(2,2,6,6-tetramethyl-4-piperidyl)sebacate
L-2: 2(2'-hydroxy-3'-t-butyl-5'-methylphenyl)-5-chlorobenzotriazole
L-3: Polycondensate of succinic acid and dimethyl-1-(2-hydroxyethyl)-4-hydroxy-2,2,6,6-tetramethylpiperidine
SDE amine: N,N-bishydroxyethylstearylamine
Talc: Micron White 5000S manufactured by Hayashi Kasei Kabushiki Kaisha Polyolefin has a disadvantage that its thermal-oxidation stability and light stability were considerably lowered by the addition of inorganic fillers.

However, in accordance with the present invention, such defects have been markedly improved by adding a specific phenolic antioxidant, a specific type of compound, a sulfur antioxidant and a light stabilizer to inorganic-filler containing polyolefins.

We claim:

1. An inorganic filler-containing polyolefin composition which comprises (a) 100 parts by weight of a polyolefin, (b) 1-100 parts by weight of an inorganic filler, (c) 0.01-1.0 part by weight of a phenolic antioxidant represented by general formula (I) shown below:

$$\left[ HO-\underset{C(CH_3)_3}{\underset{|}{\overset{R_1}{\overset{|}{\bigcirc}}}}-CH_2CH_2\overset{O}{\overset{\|}{C}}OCH_2-\underset{CH_3}{\overset{CH_3}{\overset{|}{C}}}-CH\overset{O-CH_2}{\underset{O-CH_2}{<}}C \right]_2 \quad (I)$$

wherein $R_1$ represents an alkyl group of 1-3 carbon atoms, and (d) at least one compound selected from the group consisting of the compounds represented by general formula $$R_4-N\overset{(CH_2CH_2O)_mH}{\underset{(CH_2CH_2O)_nH}{<}} \quad (IV)$$

or $$R_4-N\overset{(CH_2CH_2O)_mCOR_5}{\underset{(CH_2CH_2O)_nH}{<}}$$

wherein $R_4$ represents an alkyl group, an alkenyl group or an acyl group (R'—CO) of 8-18 carbon atoms, m and n are integers which meet $m+n=2$ to 10, R' represents an aliphatic carbon chain which may be saturated or unsaturated, and $R_5$ represents an alkyl group or an alkenyl group of 7-17 carbon atoms.

2. An inorganic filler-containing polyolefin composition of claim 1, wherein the amount of compound (d) is 0.01-1.0 part by weight based on 100 parts by weight of polyolefin.

3. An inorganic filler-containing polyolefin composition of claim 1, which further comprises 0.01-1.0 part by weight of a sulfur antioxidant.

4. An inorganic filler-containing polyolefin composition of claim 1 or claim 3, which further comprises 0.01-2.0 parts by weight of a light stabilizer.

* * * * *